United States Patent [19]

Bussgang et al.

[11] 3,909,721

[45] Sept. 30, 1975

[54] SIGNAL PROCESSING SYSTEM

[75] Inventors: Julian J. Bussgang; Herbert Gish, both of Lexington, Mass.

[73] Assignee: Signatron, Inc., Lexington, Mass.

[22] Filed: Feb. 28, 1974

[21] Appl. No.: 446,782

Related U.S. Application Data

[63] Continuation of Ser. No. 222,193, Jan. 31, 1972, abandoned.

[52] U.S. Cl. ............... 325/41; 178/67; 340/146.1 B

[51] Int. Cl.$^2$ ............... H04B 1/66

[58] Field of Search ............... 340/146.1 R, 340/146.1 A, 146.1 B, 340/146.1 BA, 146.1 BE, 206, 207, 347 AD; 179/15.55 R; 178/66 R, 67, DIG. 3; 325/38R, 39, 40, 41, 30

[56] References Cited

UNITED STATES PATENTS

| | | | |
|---|---|---|---|
| 3,071,727 | 1/1963 | Kitsopoulos | 179/15.55 R |
| 3,435,134 | 3/1969 | Richards | 179/15.55 R |

*Primary Examiner*—Benedict V. Safourek
*Attorney, Agent, or Firm*—Robert F. O'Connell

[57] ABSTRACT

A signal processing system for processing an analog signal which has been quantized by suitable sampling techniques, different portions of the quantized data information having different significances. The processing is accomplished so as to improve the overall error characteristics of the system wherein the quantized data information is encoded for transmission, the quantized data being selectively handled in the encoding process so that the more significant quantized data information is encoded in such a manner that it is afforded more protection from error during transmission than the less significant quantized data information. A receiver system appropriately decodes the encoded transmitted information by selectively reforming the arrangement of the quantized data information in conformity with the selective arrangement provided in the transmitter encoding process. The reformed quantized data information is then converted to an analog signal representing the analog signal processed by the transmitting system.

23 Claims, 18 Drawing Figures

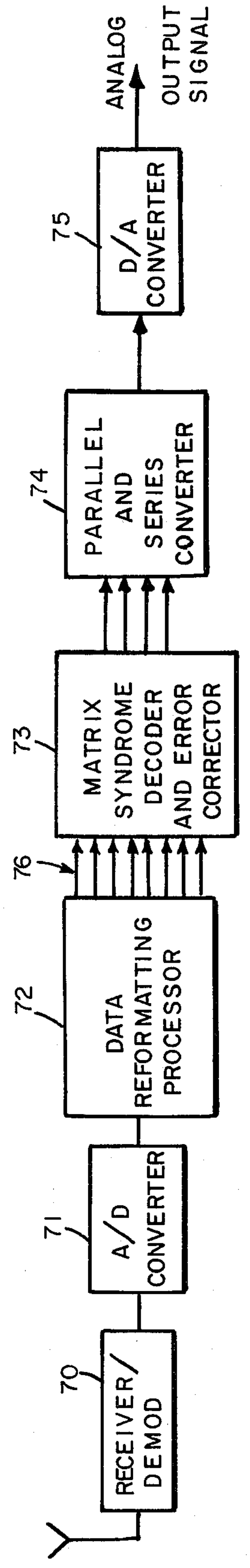
FIG.10
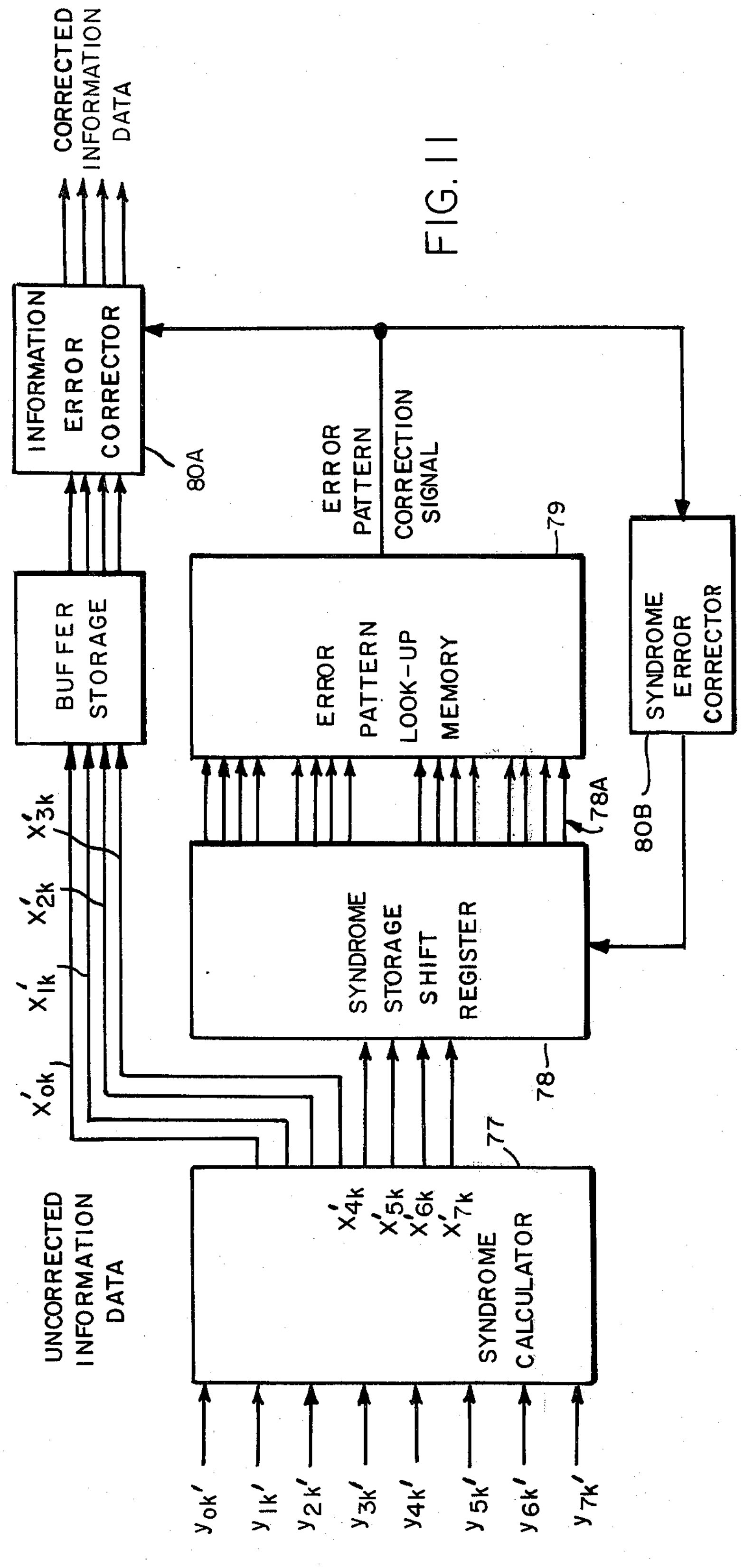

SIGNAL PROCESSING SYSTEM

This is a continuation of application Ser. No. 222,193, filed on Jan. 31, 1972, now abandoned.

This invention relates generally to signal processing systems for communication channels and, more particularly, to systems for processing quantized data information so as to minimize the chance for introducing errors in the transmission and reception of such signals wherein the quantized information is selectively processed so as to afford more protection from error to the more significant portions of such information.

In improving the level of performance of communication processes, in general, such performance is found to be limited by the trade-off which exists between signal power and bandwidth. Based on rate distortion theory, as discussed in T. J. Goblick, Jr., "Theoretical Limitations on the Transmission of Data from Analog Sources", IEEE TRansactions on Information Theory, Vol. IT-10, pp. 265–271, October 1964, for example, it can be shown that if a data source of transmission can be represented by a signal having a base bandwidth B, such transmission being performed over a transmitter channel having a bandwidth W (where W is larger than B) and a noise density ($N_0/2$), it can be shown that for a relatively large bandwidth expansion $\beta$ (where $\beta = W/B$) the signal to noise ratio at the output of the channel, $(S/N)_o$, grows exponentially with the input signal to noise ratio, $(S/N)_i$. Such relationship can be expressed as:

$$(S/N_o) = \exp(S/N)_i$$

Such expression represents the theroretical performance limit of a communication channel for relatively large bandwidth expansions (i.e., $\beta \geq 2$) provided the signal source has been quantized, or placed in digital form, by an appropriately spaced uniform quantizing system.

The performances of presently available systems fall far short of the theroretical limits of performance given by the above expression. For example, conventional frequency or phase modulation systems, single-sideband, amplitude modulation systems, or pulse code modulation systems leave a great deal of room for improvement, particularly for relatively low bandwidth expansions. In no instances do such presently known systems selectively handle the quantized data information so that the more significant portions thereof are provided with greater protection from error than those portions thereof of lesser significance.

This invention, however, utilizes a system which selectively processes quantized information so as to make the more significant (i.e., the more important) portions of the quantized information less susceptible to error which may arise during transmission through a communication channel, thereby greatly improving the performance over present systems.

In one embodiment of the invention identified as a "coded phase modulation" process, the quantized information is arranged to correspond to an angular, or phase, postion with reference to a 360° phase diagram. Such phase diagram is suitably divided into a plurality of selected angular positions and each such position is used to represent a particular selected combination of information bits. If the quantized information bit combination are appropriately selected with reference to the phase angles of the phase diagram, certain bit positions within such combinations are less susceptible to errors, while other bit positions have a greater susceptibility to errors. In accordance with the invention, the more significant information bits of the input quantized information are arranged to be placed in those bit positions affording the greater protection from error, while the less significant information bits in each combination are arranged to be placed in those positions which are subject to less protection from error. In this way the overall error is markedly reduced, as discussed in more detail below.

Another embodiment using a selective handling process in accordance with the general principles of the invention may, for example, use redundant encoding devices for encoding the quantized data information before modulating the information for transmission. Thus, for example, one or more matrix encoder devices, or a plurality of separate encoder devices, each yielding a prescribed degree of data redundancy, can be provided to encode the incoming quantized data streams. Such redundant encoding processes can be arranged to supply different degrees of redundancy and, hence, different degrees of protection from, or susceptibility to, error with respect to different data streams. The redundant encoders, for example, can be made responsive to successively obtained quantized information combinations which are continuously being fed to the encoders or such quantized information can be appropriately stored for such purpose and fed in some appropriately selected manner to the encoders. The more significant portions of such quantized information, thereby, are selected to be processed by the redundant encoding system so as to provide for greater redundancy to such more significant portions and, therefore, greater protection from error for such more significant information. The less significant portions of such information are selected to be processed by the redundant encoding system so that lesser, or no, redundancy is provided for such less significant information and therefore, less protection from error is provided therefor.

Each of the processes, as discussed in general terms above, is described in more detail below and can be understood more clearly with reference to the accompanying drawings wherein FIG. 1 shows in block diagram form a transmitting system using coded phase modulation techniques in accordance with one embodiment of the invention:

FIG. 10 shows a general block diagram of a receiver system used with reference to the transmitting system of FIG. 8;

FIG. 11 shows a block diagram of a specific embodiment of a receiver system for use with the transmitting system of FIG. 8;

Figures 1, 2, 3, 4:
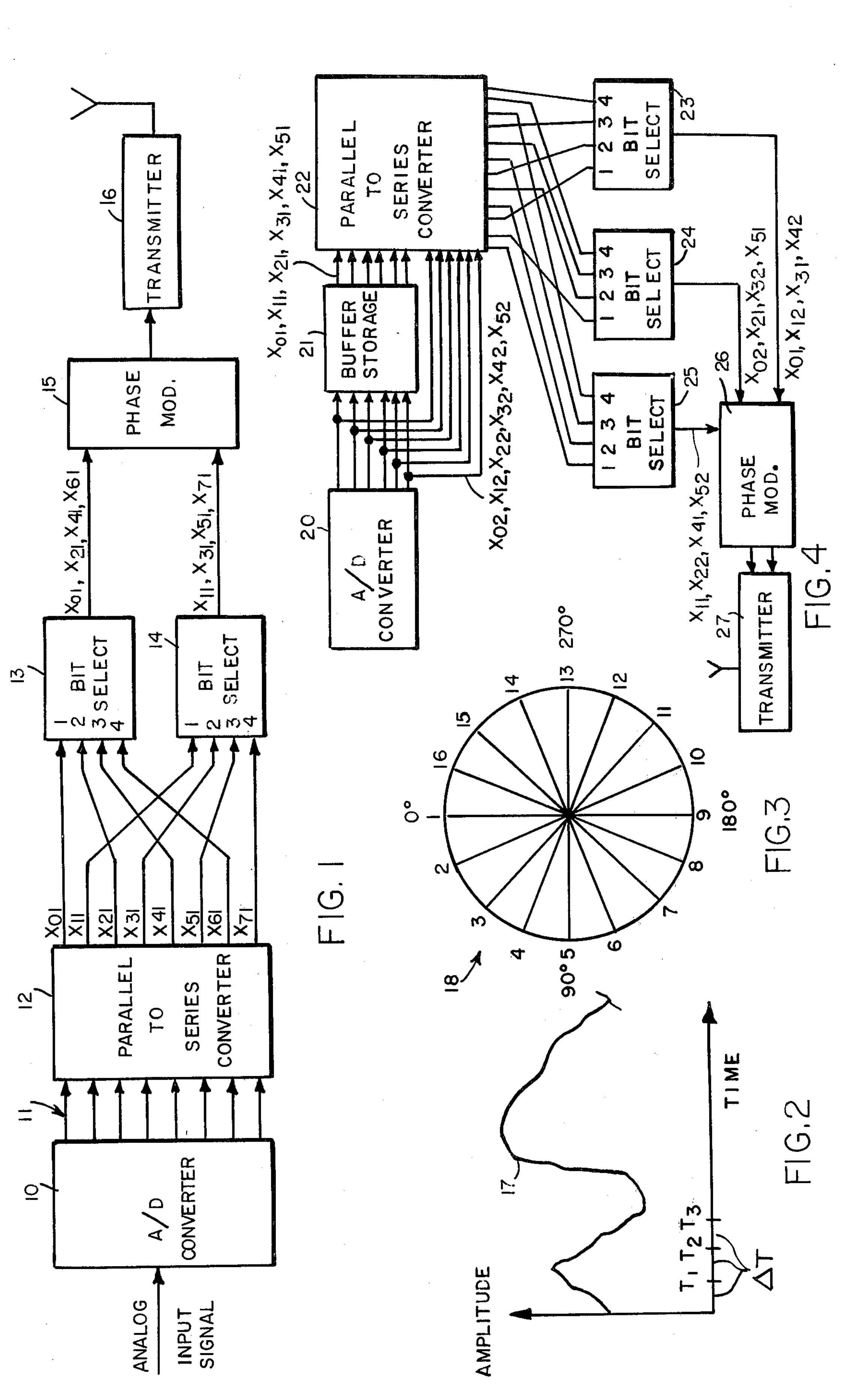
FIG. 2 shows an analog signal which can be appropriately quantized for use with the invention.
FIG. 3 shows a phase diagram used to explain the operation of the system of FIG. 1.
FIG. 4 shows a block diagram of an alternative embodiment of the system of FIG. 1.

FIG. 1 shows in relatively broad block diagram form a processing system which utilizes coded phase modulation techniques for minimizing errors within the system in accordance with the invention. As can be seen therein an analog input signal is quantized into digital form by being fed to an appropriate analog to digital converter 10 which thereupon produces quantized information in the form of parallel generated information bits, as signified by lines 11, which are then converted from parallel form to series form in a parallel to series converter 12, as is well known in the art, so as to produce a serial data bit system representing the quantized analog data.

In a specific example, an analog signal 17 as shown in FIG. 2 may be periodically sampled at an appropriate rate (indicated by the period $\Delta T$) so that the amplitude of each such sampled information is represented by an appropriate sequence of binary bits in a manner well known to those in the art. For example, the amplitude level of the analog signal at any sampled time may be represented as having one of $2^8$ values (i.e., 256 different values) and accordingly can be represented by a quantized signal of 8 bits as shown at the output of A/D converter 10. Thus, if each sample arrives every $\Delta T$ seconds and it is desired to transmit all of the quantized data, it is necessary to transmit 8 bits within each $\Delta T$ second interval. Such data can be transmitted by using a coded phase modulation system of the invention, the operation of which, for example, can be explained with reference to the phase modulation diagram having 16 phase positions, each position representing a selected 4 bit data stream sequence, as discussed below.

For example, one particular quantized amplitude level, $Y_1$, as obtained from parallel to series converter 12 may be represented by an 8-bit combination, or "PCM word":

$X_{01}, X_{11}, X_{21}, X_{31}, X_{41}, X_{51}, X_{61}, X_{71}$ where $Y_1 = 2^0X_{01} + 2^{-1}X_{11} + 2^{-2}X_{21} + \ldots +2^{-6}X_{61} +2^{-7}X_{71}$ This type of analog-to-digital conversion of successive signal samples is encountered in the use of known pulse code modulation (PCM) techniques.

As is well known, the most significant information bit in each such sequence is contained in bit $X_{01}$ and the least significant information bit is contained in bit $X_{71}$, with the intervening information bits having progressively decreasing significance. Thus, it is desirable to provide a system in which the first four bits (e.g., bits $X_{01}, X_{11}, X_{21}, X_{31}$ in each 8-bit PCM sample) are selectively arranged and processed so as to be afforded greater protection from errors during transmission than the last four bits (e.g., bits $X_{41}, X_{51}, X_{61}, X_{71}$ in each 8-bit PCM word).

If the quantized information from converter 12 is to be phase modulated in accordance with the coded phase modulation system of the invention for this purpose, such selection can be achieved as follows. As shown in FIG. 1, two bit selector subsystems 13 and 14 are used to supply data information to a phase modulator 15 in which selected phases can be represented as specified angular positions on a 360° phase diagram 18, such as shown in FIG. 3. Thus, for example, the phase modulator is used to modulate the selected 4-bit sequences from each input 8-bit combination, as provided by the bit selection process, by a representation on the phase diagram of 16 different phase positions (as is well known, there are 16 possible combinations of 4-bit binary sequences). The 16 positions shown on the phase diagram are designated from the 0° position (Phase Position 1) through consecutive counterclockwise angles of 22½° to the 337.5° position (Phase Position 16). The phases are effectively arranged to represent the following 4-bit combinations:

| Phase Position No. | Bit Combinations Bit No. 1 | Bit No. 2 | Bit No. 3 | Bit No. 4 |
|---|---|---|---|---|
| 1 | 0 | 0 | 0 | 0 |
| 2 | 0 | 0 | 0 | 1 |
| 3 | 0 | 0 | 1 | 1 |
| 4 | 0 | 0 | 1 | 0 |
| 5 | 0 | 1 | 1 | 0 |
| 6 | 0 | 1 | 1 | 1 |
| 7 | 0 | 1 | 0 | 1 |
| 8 | 0 | 1 | 0 | 0 |
| 9 | 1 | 1 | 0 | 0 |
| 10 | 1 | 1 | 0 | 1 |
| 11 | 1 | 1 | 1 | 1 |
| 12 | 1 | 1 | 1 | 0 |
| 13 | 1 | 0 | 1 | 0 |
| 14 | 1 | 0 | 1 | 1 |
| 15 | 1 | 0 | 0 | 1 |
| 16 | 1 | 0 | 0 | 0 |

As can be seen, the 4-bit combinations are arranged so that there is a change in only one bit position between any two adjacent phase positions. Thus, with reference to Phase Position No. 1 and Phase Position No. 2, the bit sequences differ only in the fourth position (Bit No. 4); Phase Positions Nos. 2 and 3 differ only in the third position; etc. In the above scheme, the highest chance for making an error exists only between adjacent phase positions, that is, it is more likely that errors will occur in distinguishing between angular measurements separated by 22½° than between angular measurements separated by 45° or more. As can be seen, then, each such most likely error will produce an error is only a single bit position, since adjacent phase positions differ in only a single bit position. A review of the scheme devised above, indicates that there are a total of 32 ways in which an error is most likely to be made (e.g., when a bit changes from 0 to 1 or vice-versa in adjacent phase positions).

For example, there are four most likely ways of making an error in bit No. 1. Two such ways exist with reference to Phase Positions Nos. 8 and 9 wherein the bit values in adjacent phase positions differ. Two additional ways of making an error exist with reference to adjacent Phase Positions Nos. 1 and 16, where again the values in the bit No. 1 position differ.

In a manner similar to that discussed with reference to bit No. 1, there are four most likely ways for a bit No. 2 error to occur, namely between Phase Positions Nos. 4 and 5 and between Phase Positions Nos. 12 and 13.

On the other hand, there are eight most likely ways for an error to occur with respect to bit No. 3 and sixteen ways for an error to occur in bit No. 4.

Thus, it can be seen that bit positions No. 1 and No. 2 afford the greater protection from error in such a phase modulation scheme, while bit positions No. 3 and No. 4 afford lesser protection from error.

Since the first four bits of each 8-bit PCM word (i.e., $X_{01}$, $X_{11}$, $X_{21}$, $X_{31}$) as obtained from the parallel to series converter 12, are the more important information bits in each such sequence, it is desirable that those first four information bits be placed in bit positions No. 1 and No. 2 with reference to each bit selector so as to receive the greater protection from error, while the last four bits of each 8-bit PCM word (i.e., $X_{41}$, $X_{51}$, $X_{61}$, $X_{71}$) from parallel to series converter 12 can be placed in bit positions No. 3 and No. 4 of each bit selector. The bit selectors thus effectively provide a bit combination format which affords greater protection from error for the most significant data information.

Thus, the first bit $X_{01}$ is placed in the bit position No. 1 of the bit selector 13 and the second bit $X_{11}$ in the bit position No. 1 of the bit selector 14. The third bit $X_{21}$ is placed in bit position No. 1 of bit selector 13 and the fourth bit $X_{31}$ is placed in bit position No. 2 of bit selector 14. The fifth bit $X_{41}$ is placed in bit position No. 3 in bit selector 13 and the sixth bit $X_{51}$ is placed in bit position No. 3 in bit selector 14. Finally, the seventh bit $X_{61}$ is placed in bit position No. 4 of bit selector 13 and the eighth bit $X_{71}$ is placed in bit position No. 4 of bit selector 14. The effective interlacing of the bits from parallel to series converter 12 is accomplished as shown in FIG. 1, wherein the selected bit combination $X_{01}$, $X_{21}$, $X_{41}$, $X_{61}$ from selector 13 is fed as one 4-bit combination to phase modulator 15 and selected bit combination $X_{11}$, $X_{31}$, $X_{51}$, $X_{71}$ from selector 14 is fed as a second 4-bit combination to phase modulator 15 for modulating the phase of the transmitter signal at transmitter 16.

In accordance with the bit selection, or formating, process, the first four bits of the 8-bit PCM word are placed in the more protected, or less error-susceptible, positions in the phase modulator (i.e., bit positions No. 1 and No. 2 from each bit selector), while the last four bits of the 8-bit PCM word are placed in the less protected, or more error-susceptible, positions in the phase modulator (i.e., bit positions No. 3 and No. 4 form each bit selector).

Thus, a suitable match is obtained between the more important data of the 8-bit data streams and the more protected bit positions in the phase modulation process so that the overall error is reduced. The same modulation process is used with reference to each 8-bit parallel data streams as it is sequentially obtained from the output of parallel to series converter 12.

A comparison of the errors which would arise in such a matching scheme as discussed above and those which would arise in a more conventional or straightforward non-selective phase modulation scheme can be made. In such a conventional system which assumes a random assignment of phase positions to each 4-bit combination and in which no selection is made of the bits from each data stream for phase modulation, a mean square error can be represented by the following equation:

$$\overline{e^2} = 4\,P_e\,(1/4)\,\left(\sum_{i=1}^{8} 2^{-2i}\right)$$

$$\overline{e^2} \approx 4\,P_e\,\frac{1}{12}$$

where $P_e$ is the probability of a phase error.

In the system of the invention, if each 8-bit sequence is modulated by phase modulators 15 and 16 in accordance with the selection scheme discussed above to provide a greater protection from error, the error can be represented by the following equation:

$$\overline{e^2} = 4\,P_e\left[\frac{2^{-2}+2^{-4}+2^{-6}+2^{-8}}{8} + \frac{2^{-10}+2^{-12}}{4} + \frac{2^{-14}+2^{-16}}{2}\right]$$

$$\overline{e^2} \approx 4\,P_e\,\frac{1}{24}$$

again where $P_e$ is the probability of a phase error.

A comparison of the two error expressions shows that the system of the invention provides about a 3*db* improvement in performance.

Figure 5:
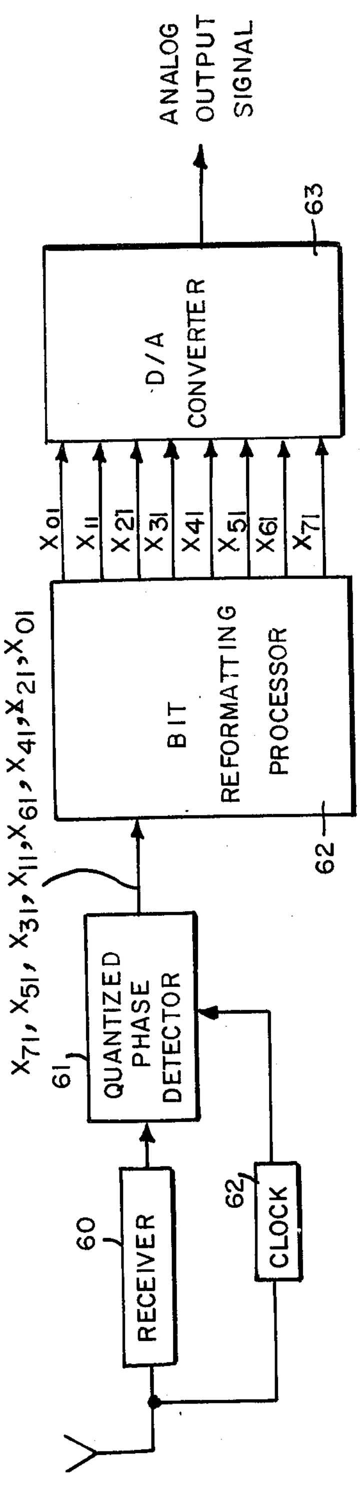
FIG. 5 shows a block diagram of one embodiment of a receiver system for use in conjunction with the transmitting system of FIG. 1.

With respect to the transmitter embodiment of FIG. 1 an appropriate receiver for demodulating and decoding the received signal in order to reproduce the analog input signal which was originally encoded, is shown in FIG. 5. In the receiver process an effective inverse processing of the incoming signal takes place wherein an appropriate receiver 60 receives the signal transmitted through a communication channel from transmitter 16. The received signal is first fed to a suitable quantized phase detector 61 which detects the phase of the input signal at selected sampled times and produces the appropriate quantized 4-bit combinations representing the detected phases in accordance with the encoding arrangement discussed above with reference to FIGS. 1–3. The selected sample times are synchronized with the sample times utilized in the transmitter by a suitable synchronized clock subsystem as is known in the art and is diagrammatically represented by clock 62. Thus, the output of phase demodulator 61 can be represented by successive 4-bit combinations, as shown, each representing the phase at successive selected sample times. Such output bit combinations are fed to a bit reformatting processor 62 which operates upon the input 4-bit combination to rearrange them so as to reproduce the successive 8-bit combinations corresponding to the 8-bit combinations at the output of parallel to series converter 12 in the transmitter system. Such 8-bit combination streams are then fed to an appropriate D/A converter 63 which produces an analog output signal which is essentially a reproduction of the analog input signal to the transmitter system of FIG. 1.

An alternative embodiment of the coded phase modulation technique in the transmission system is shown in FIG. 4 wherein the more significant information from adjacent samples of the input signal at the output of the A/D converter 20 are also interlaced. In the system shown in FIG. 4, for simplicity, the amplitude of the sampled input signal is represented by one of $2^6$ values as shown by the six arrows at the output of A/D converter 20. Thus, the quantized data representing a first sample is fed from A/D converter 20 to a buffer storage device 21 where it can be suitably stored until the quantized data representing the next sample is obtained from A/D converter 20. When the latter is obtained, information from each sample is then made available for subsequent processing by a parallel to series converter 22, the data bits from each sample being supplied thereto so as to produce an output data stream wherein the data bits from the two successive adjacent samples are interlaced and the more significant data bits from each sample are appropriately positioned so that they can be suitably selected by bit selectors 23 and 24 for modulation by phase modulator 25, in a manner similar to that discussed above.

For example, such a process is described below for the sixty four (i.e., $2^6$) level system, wherein each quantized sample of the input signal is represented by a 6-bit data combination. The data combinations for the adjacent samples can be generally identified as:

| Sample 1 | Sample 2 |
|---|---|
| $X_{01}$ $X_{11}$ $X_{21}$ $X_{31}$ $X_{41}$ $X_{51}$ | $X_{02}$ $X_{12}$ $X_{22}$ $X_{32}$ $X_{42}$ $X_{52}$ |

The first two bits of each sample are the more important ones, the next two bits are of intermediate importance, and the last two bits are the less important ones. The first sample is stored in buffer storage device 21 and the data bits from each sample are thereupon supplied simultaneously to converter 22 to produce output 12-bit data streams wherein the data bits from adjacent samples alternate in the data bit streams produced at the output of converter 22.

Accordingly, the output of converter 22 is a 12-bit data stream which takes the interlaced form:

$X_{01}$ $X_{02}$ $X_{11}$ $X_{12}$ $X_{21}$ $X_{22}$ $X_{31}$ $X_{32}$ $X_{41}$ $X_{42}$ $X_{51}$ $X_{52}$

Such 12-bit data stream is modulated in accordance with bit selection and phase modualtion techniques, via bit selectors 23, 24, 25 and phase modulator 26 for transmission via transmitter 27, in the manner generally discussed above with reference to FIG. 1, and an appropriate matching between the more significant data information and the more protected positions in modulation scheme occurs as before.

Thus, in the above embodiments of the invention the provision for greater protection to more important data is achieved by appropriately selecting the data bit combinations represented by each phase position in accordance with a suitable encoding arrangement which most effectively reduces the overall errors which occur.

Figure 6:
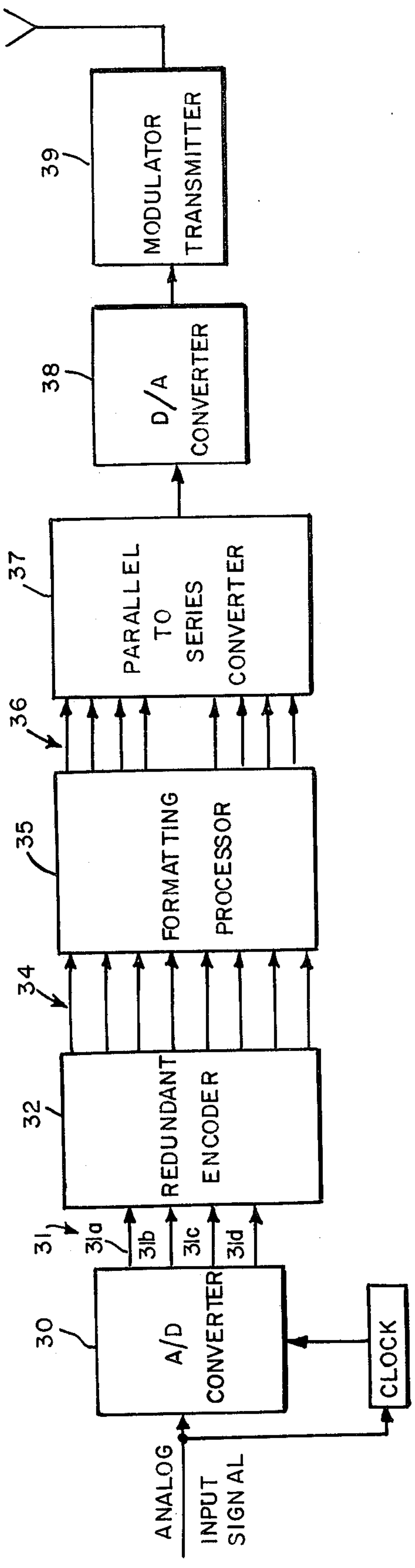
FIG. 6 shows a general block diagram of an alternative embodiment of a transmitting system of the invention using redundant encoding techniques.

Another embodiment of the invention also broadly utilizing the basic technique of appropriately encoding a quantized signal and arranging, or formatting (i.e., providing a suitable format of the data information), the data for effectively matching the most important data to the more protected positions within the encoding system, is described with reference to FIG. 6 wherein data protection is achieved by the use of redundancy encoding techniques. In such figure, an analog signal is appropriately quantized to produce parallel digital data via A/D converter 30 which for a 4-bit quantized signal provides four parallel outputs as shown by the arrows 31 from converter 30. The type of A/D conversion which is used here and in other embodiments of the invention as described later is not intended to be limited to any specific manner of A/D conversion and may include, inter alia, for example, such techniques as are generally referred to in the art as "predictive quantization" or "differential pulse code modulation" techniques, as described in the article of J. B. O'Neal, "Predictive Quantizing Systems (Differential Pulse Code Modulation) for The Transmission of Television Signals", Bell System Technical Journal, Vol. 45, pp. 689–720, June 1966.

For the purposes of illustration, it is assumed that the first bit of each 4-bit parallel data stream, which appears for example on arrow 31*a*, contains the most significant, or important, data at each quantized level, while the bits in successive arrows contain information of progressively less significance so that the lowest arrow 31*d* represents the least significant data bit of each 4-bit combination. In the general system shown in FIG. 6 the 4-bit parallel data streams are fed to an appropriate redundant encoder, shown generally here as encoder 32, and discussed in more detail below, which encoder produces a greater information output (because of the redundancy which has been introduced) than the information input which is fed to the encoder. The increased output data is represented in FIG. 6 by the 8-bit data stream lines depicted by arrows 34, as shown at the output of encoder 32. The increase in data information and the characteristics thereof as produced by the redundant encoder 32 depends on the type of redundant encoding which is utilized, the 8-bit data stream lines diagrammatically shown in FIG. 6 being exemplary only. More detailed discussion of specific redundancy encoder techniques are provided below.

The output from the encoder is then appropriately arranged in a suitable format by a formatting processor 35 which arranges the 8 input data streams into two parallel groups of 4-bit data streams as shown at the output thereof by arrows 36.

The 4-bit data streams are then fed to a parallel to series converter 37 so that the data information is put into a serial form for feeding to an appropriate D/A converter 38, the analog signal therefrom being appropriately modulated and transmitted by a suitable modulator/transmitter subsystem 39.

In the redundancy encoder, 32, by providing greater degrees of redundancy to the more significant portions of the input information supplied thereto, such more significant information is provided with more protection from error by the encoding process than the less significant information, as discussed in more detail in specific examples given below.

Figure 7:
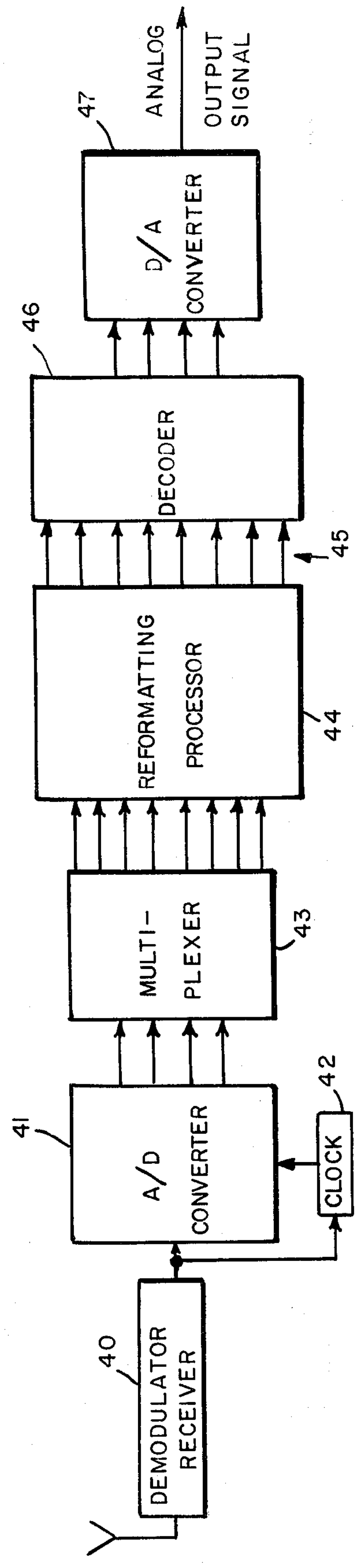
FIG. 7 shows a general block diagram of an embodiment of a receiver system for use in conjunction with the redundant encoding system of FIG. 6.

In the general block diagram of a receiver-decoding system shown in FIG. 7, an inverse processing of the input signal to the receiver is provided, wherein the input signal is first demodulated at a suitable receiver/-demodulator 40, the output of which is fed to an A/D converter 41 for producing quantized information representing the input demodulated signal at suitably sampled times. The receiver operation is appropriately synchronized with the transmitter operation in any well known manner as signified diagrammatically by a clock 42. The signal in quantized form is then fed to a multiplexer subsystem 43 which produces a parallel set of two 4-bit data streams equivalent to those shown at the output of formatting processor 35 of the transmitter. Such data streams are then reformed by a reformatting processor 44 to produce 8-bit data streams as designated by arrows 45. Such signals are then appropriately decoded by a decoder 46 to produce the 4-bit parallel data streams equivalent to those shown at the input of encoder 32 of the transmitter system. The decoding process performed by decoder 45 effectively is the inverse of the encoding process used in encoder 32, specific examples of both the encoder and decoder operation being given below. The output of the decoder 46 is then fed to a suitable D/A converter 47 to provide an analog output signal which effectively is a reproduction of the analog input signal to the transmitter system.

A particular encoding and decoding technique utilizing redundancy principles is described with reference to FIGS. 8–14. Such technique is herein identified by the term "cross-stream tapered" encoding. In such a system, as described in more detail below, the parallel data streams received from an A/D converter are fed to a redundancy encoder which operates on the input data fed thereto through the use of a matrix convolutional or block code which not only converts the number of input data streams to a larger number of output data streams but also effectively provides different degrees of protection (i.e., different assignments of redundancy via the matrix) across the input data streams.

Figure 8:
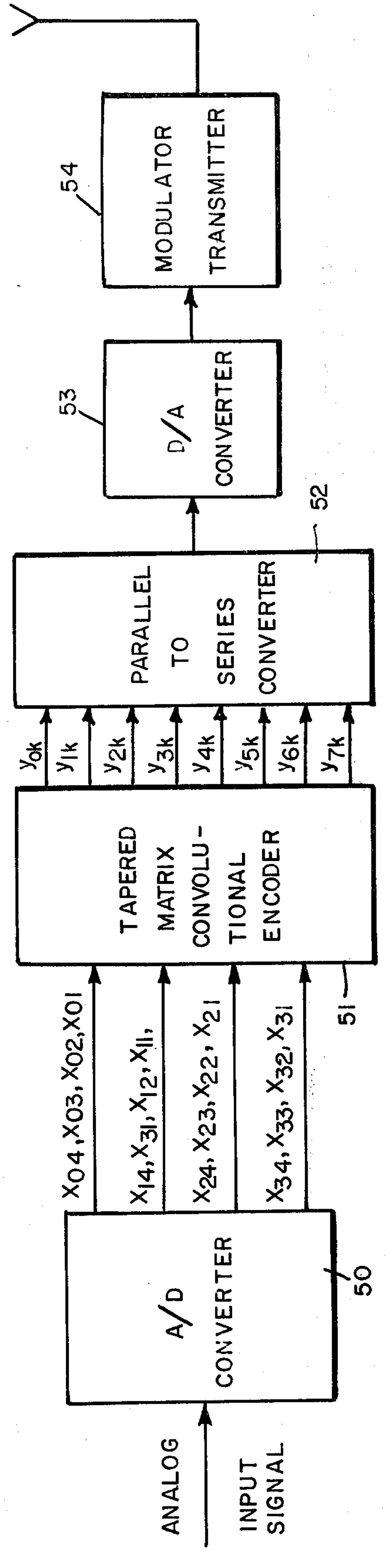
FIG. 8 shows a block diagram of a specific embodiment of a transmitting system of the invention using a matrix redundant encoding technique with reference to FIG. 6.

For example, as shown in FIG. 8 an analog input signal is converted to a quantized, or digital, signal via A/D converter 50, each sample being represented by a 4-bit combination which designates one of sixteen ($2^4$) sample amplitude levels of the input signal. Accordingly four data streams are shown at the output side of converter 50, such streams being grouped so that the data information in the first data stream (identified as data bits $X_{01}$, $X_{02}$, $X_{03}$, $X_{04}$ . . . etc.). comprises the most significant data bit information for each sample while the remaining data streams identified as:

$X_{11}$, $X_{12}$, $X_{13}$, $X_{14}$ . . . etc.
$X_{21}$, $X_{22}$, $X_{23}$, $X_{24}$ . . . etc.
$X_{31}$, $X_{32}$, $X_{33}$, $X_{34}$ . . . etc.

comprise data information which progressively decreases in significance. The data streams are then fed to an appropriate cross-stream tapered matrix encoder 51 which, as a specific example, is arranged to produce eight output data streams containing redundant information. The overall encoding process operates to produce information at a rate equal to the ratio of the number of input data streams *k* (in this case 4) to the number of output data streams *m* (in this case 8) and the information rate k/m of the cross-stream tapered encoding system is then ½ for the example under consideration.

In accordance with a specific example of such operation the encoder 51 in FIG. 8 is shown as using a cross-stream tapered generating matrix G of the form $$G = \begin{matrix} 1 & 0 & 0 & 0 & a_1 & a_2 & a_3 & a_4 \\ 0 & 1 & 0 & 0 & 0 & b_1 & b_2 & b_3 \\ 0 & 0 & 1 & 0 & 0 & 0 & c_1 & c_2 \\ 0 & 0 & 0 & 1 & 0 & 0 & 0 & d_1 \end{matrix}$$

where $a_i$, $b_i$, $ci$ , *and* $d_i$ are polynomials in D, which is defined as the matrix delay operator. The delays introduced in accordance with matrix G can be implemented appropriately by shift register devices with the number of stages of such shift registers corresponding to the highest power of D utilized in any polynomial.

The above matrix G is so arranged that the first four data streams of the eight data streams produced by the encoder 51 represent the four input data streams without change and are effectively produced in accordance with the left half of the generator matrix G. The last four data streams produced by the encoder are formed by the right half of the generator matrix G, such data streams being effectively regarded as parity check data streams. The code represented by the matrix G is designed to have a tapered format so that parity can be checked with different degrees of redundancy across the data streams. Accordingly, the concept of a "cross-stream tapered matrix encoder", as used herein, means that the digits in the more significant information data streams are checked by a greater number of parity checks than the digits in the less significant information data streams. Thus, as shown below in the case of a matrix convolutional encoder, digits in the most significant data stream are checked by parity checks on all four parity data streams, while digits in the least significant data steam are checked by the parity checks in only one parity data stream. A specific example for the matrix G, containing polynomials in D, can be set up as follows:

$$G = \begin{matrix} 1 & 0 & 0 & 0 & 1+D & D+D^2 & 1+D^2 & 1+D \\ 0 & 1 & 0 & 0 & 0 & 1+D & D+D^2 & 1+D^2 \\ 0 & 0 & 1 & 0 & 0 & 0 & 1+D & D+D^2 \\ 0 & 0 & 0 & 1 & 0 & 0 & 0 & 1+D+D^2 \end{matrix}$$

Operating on the information contained in the input data stream the output as indicated at the output of encoder 51 is represented by eight data streams $Y_{0k}$ through $Y_{7k}$ of the form shown in the drawing.

The relationship between the output data streams and the input data streams is given below and, as can be seen, includes the four input data streams, produced as unchanged by the left half of matrix G and the four parity check data streams produced by the right half of matrix G:

$$\begin{aligned}
Y_{0k} &= X_{0k} \\
Y_{1k} &= X_{1k} \\
Y_{2k} &= X_{2k} \\
Y_{3k} &= X_{3k} \\
Y_{4k} &= X_{0k} + X_{0k} + 1 \\
Y_{5k} &= X_{0k+1} + X_{0k+2} + X_{1k} + X_{1k+1} \\
Y_{6k} &= X_{0k} + X_{0k+2} + X_{1k+1} + X_{1k+2} + X_{2k} + X_{2k+1} \\
Y_{7k} &= X_{0k} + X_{0k+1} + X_{1k} + X_{1k+2} + X_{2k+1} + X_{2k+2} + X_{3k} + X_{3k+1} + X_{3k+2}
\end{aligned}$$

where *k* is a running index.

Figure 9:
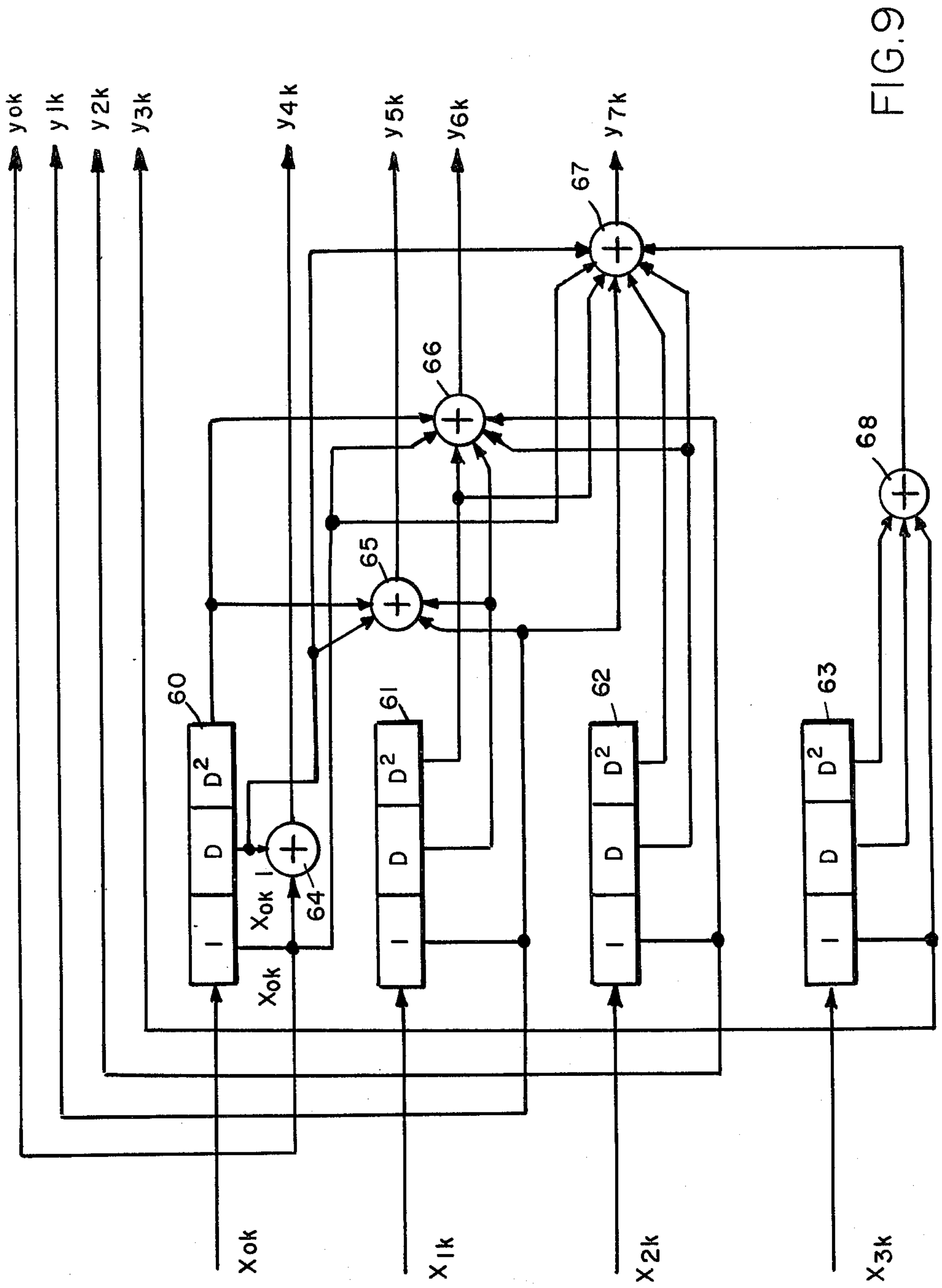
FIG. 9 shows a block diagram of a specific embodiment of a portion of the system shown in FIG. 8.

The implementation of such a tapered matrix is shown in FIG. 9 wherein the generalized input signals so the matrix encoder are identified as the signals $X_{0k}$, $X_{1k}$, $X_{2k}$, $X_{3k}$. Four shift registers 60, 61, 62 and 63 are used to operate on the input signal to produce the eight output signals $Y_{0k}$, $Y_{1k}$, $Y_{2k}$, $Y_{3k}$, $Y_{4k}$, $Y_{5k}$, $Y_{6k}$, $Y_{7k}$, as expressed above. Thus, in accordance with such matrix, the four input signals are reproduced exactly by the left-hand side of the matrix as shown by the identity of signals $X_{0k}$, $X_{1k}$, $X_{2k}$, $X_{3k}$ and the signals $Y_{0k}$, $Y_{1k}$, $Y_{2k}$, $Y_{3k}$. However, to generate the signal $Y_{4k}$, for example, in accordance with the matrix format set forth above, the input signal $X_{0k}$, is operated upon by the matrix expression 1+D where D represents the time shift delay operator, as mentioned above. Thus, as shown, the output of the shift register 60 provides an undelayed signal $X_{0k}$ and a signal delayed by one time unit and designated as $X_{0k+1}$, such signals being added in a summation circuit 64, the output of which thereby produces the signal $Y_{4k}$. The remaining signals $Y_{5k}$, $Y_{6k}$ and $Y_{7k}$ are similarly produced in accordance with the above-identified matrix format through the appropriate summation of various signals from shift registers 60–63 and summation circuits 65–68, as shown.

The eight data streams at the output of the tapered matrix encoder are then fed to an appropriate parallel to series converter 52, as shown in FIG. 8, and thence to an appropriate modulator/transmitter 54 via D/A converter 53 for transmission. In effect the tapered matrix encoder provides not only the necessary encoding but also the matrix format arranges the encoded signal in appropriate form for conversion to serial data for transmission.

At the receiver shown generally in FIG. 10 the received signal is decoded as discussed below and errors which may have occurred during transmission of the transmitted signal are appropriately corrected so that the input analog signal at the input of the transmitter can be faithfully reproduced. In FIG. 10 the receiver system includes a receiver/demodulator 70 for suitably demodulating the input signal. The output of the demodulator is fed to an A/D converter 71 which quantizes the transmitted analog signal and feeds the quantized signal to a data reformatting processor 72 which arranges the data into the format of parallel 8-bit data streams corresponding to the 8-bit data streams at the output of the tapered matrix encoder 51 of the transmitter. Such data output, as represented by the arrows 76, is fed to an appropriate matrix syndrome decoder and error corrector 73, discussed in greater detail below. The latter decoder and error corrector provides appropriate corrections for errors which may have occurred in the input information during its transmission over the communication channel.

The output of decoder 73 produces series of corrected 4-bit data combinations corresponding to the 4-bit data combinations which were present at the input of the matrix encoder 51 in the transmitter. Such 4-bit data combinations are then appropriately fed to a parallel to series converter 74 and thence to D/A converter 75 which provides an output analog signal which is effectively a reproduction of the analog input signal at the input to the transmitter.

The operation of the matrix syndrome decoder unit 73 is discussed in more detail with reference to FIGS. 11–13. In FIG. 11 the reformed 8-bit data streams represented by arrows 76 in FIG. 10 are identified in FIG. 11 as $y'_{0k}$, $y'_{1k}$, $y'_{2k}$, $y'_{3k}$, $y'_{4k}$, $y'_{5k}$, $y'_{6k}$, $y'_{7k}$ which are fed into a syndrome calculator 77 the operating characteristics of which are determined by a pseudo-inverse matrix $G^{-1}$ of the form:

$$G^{-1} = \begin{matrix} D & 0 & 0 & 0 & 1+D & 0 & 0 & 0 \\ 0 & D & 0 & 0 & 0 & 1+D & 0 & 0 \\ 0 & 0 & D & 0 & 0 & 0 & 1+D & 0 \\ 0 & 0 & 0 & D+D^2 & 0 & 0 & 0 & 1+D+D^2 \\ 1 & D & 1+D+D^2 & 1+D^3 & 1 & D & 1+D+D^2 & 1+D^3 \\ 0 & 1 & D & 1+D+D^2 & 0 & 1 & D & 1+D+D^2 \\ 0 & 0 & 1 & D & 0 & 0 & 1 & D \\ 0 & 0 & 0 & 1 & 0 & 0 & 0 & 1 \end{matrix}$$

which has the property that the left half of $GG^{-1}$ is a diagonal matrix and the right half has all zero elements. Forney proves that a feed-back free (i.e., no polynomial fraction) pseudo-inverse matrix $G^{-1}$ can always be found. (See G. D. Forney, Jr. "Convolutional Codes I: Algebraic Structure", IEEE Transactions on Information Theory, Vol. IT-16, No. 6, Nov. 1970, pp. 720–738).

The output of such inverse matrix is also in the form of 8 data streams $x'_{0k}$, $x'_{1k}$, $x'_{2k}$, $x'_{3k}$, $x'_{4k}$, $x'_{5k}$, $x'_{6k}$, $x'_{7k}$, the first four of which represent uncorrected data information as shown in FIG. 11 as calculated by the left-hand side of inverse matrix $G^{-1}$ and the last four of which represent the syndromes as calculated by the right half of inverse matrix $G^{-1}$. Such syndromes are then successively stored in a syndrome storage shift register unit 78 to provide a preselected number of successive syndromes (represented by the arrows 78A at the output of storage unit 78 to be used in determining an error pattern as discussed in more detail below, which error pattern is either located in a computer pattern look-up memory system 79 or generated by a suitable algorithm from the stored set of syndromes. In either case, an appropriate correction signal is produced at information error corrector 80A to correct for the error pattern most likely to correspond to the particular sequence of syndromes which was calculated by the calculator 77. To avoid the accumulation of errors in the system, correction of the syndromes stored in the shift register 78 must also be made via syndrome error corrector 80B. The general principles of operation of syndrome calculation for decoding are discussed in the above-reference article of Forney. A particular example of a single-error correction system is discussed more fully below with reference to FIGS. 12 and 13, wherein a single bit error in the 8-bit data streams at the input of syndrome calculator 77 produces a unique error pattern at the output of storage unit 78 as a result of which the look-up memory system provides a correction signal for correcting such error at error corrector 80A so that corrected information data is then available for appropriate conversion to the reproduced analog output signal and for correcting the syndromes stored in shift register 78 via syndrome error connector 80B so that no error accumulation will occur.

Figure 12:
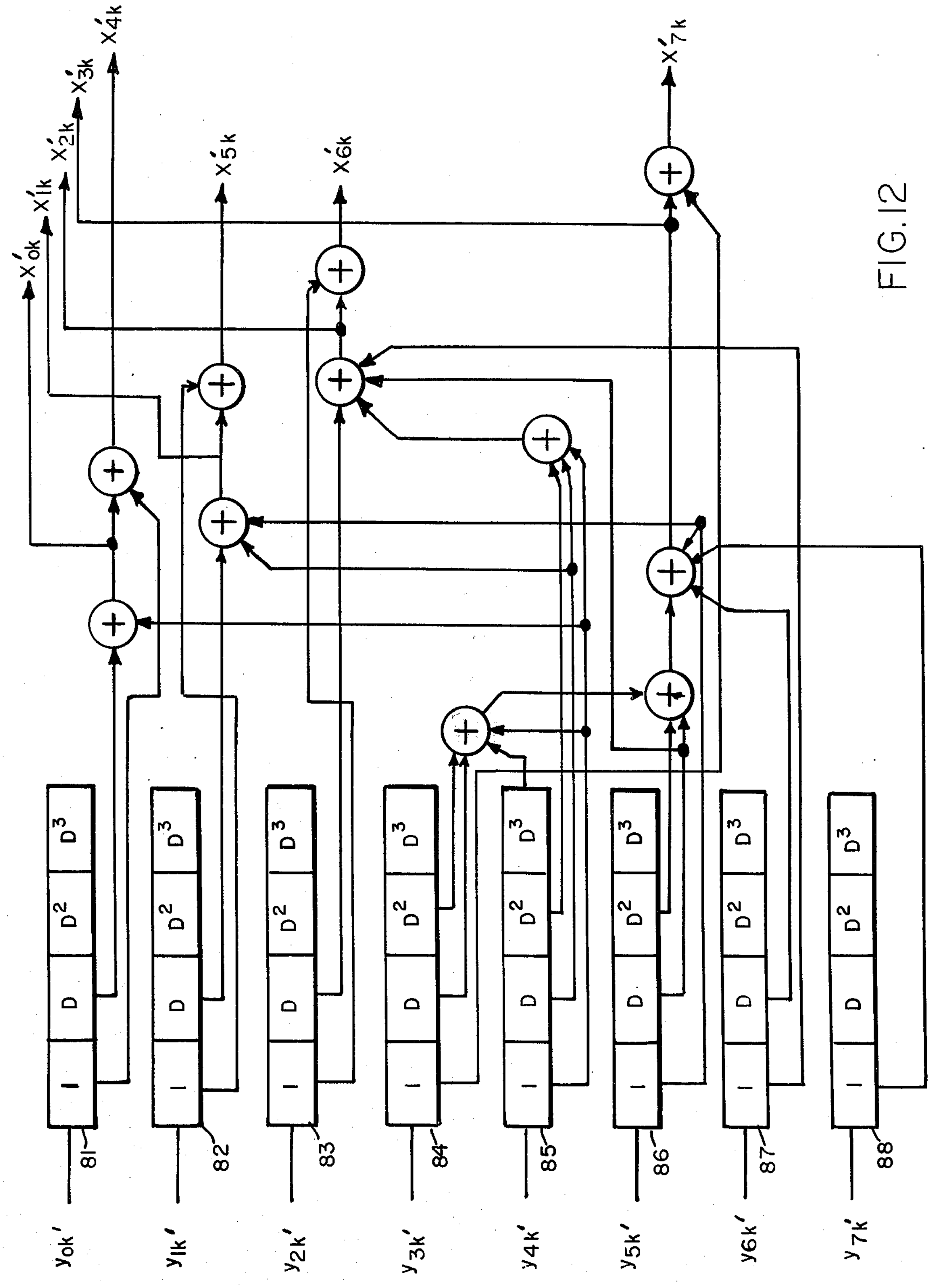
FIG. 12 shows a block diagram of a specific embodiment of a portion of the system shown in FIG. 11.
Figure 14:
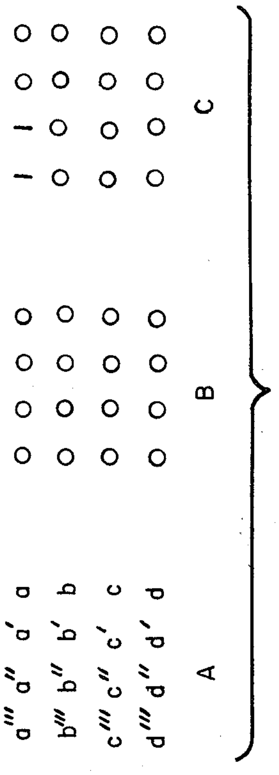
FIG. 14 shows a plurality of error pattern configurations used to explain the operation of the system shown in FIGS. 11–13.

In the example under discussion, if the inverse matrix $G^{-1}$ at the decoder is of the form as set forth above, the eight data streams at the input to the syndrome calculator are fed to eight shift registers 81–88 as shown in FIG. 12. In a manner similar to that discussed with reference to the encoding shift register operation, the right half of the inverse matrix $G^{-1}$ produces the four data streams $x'_{4k}$, $x'_{5k}$, $x'_{6k}$ and $x'_{7k}$ as shown. The left half of inverse matrix $G^{-1}$ produces the uncorrected information data $x'_{0k}$, $x'_{1k}$, $x'_{2k}$, $x'_{3k}$ as shown therein also.

Figure 13:
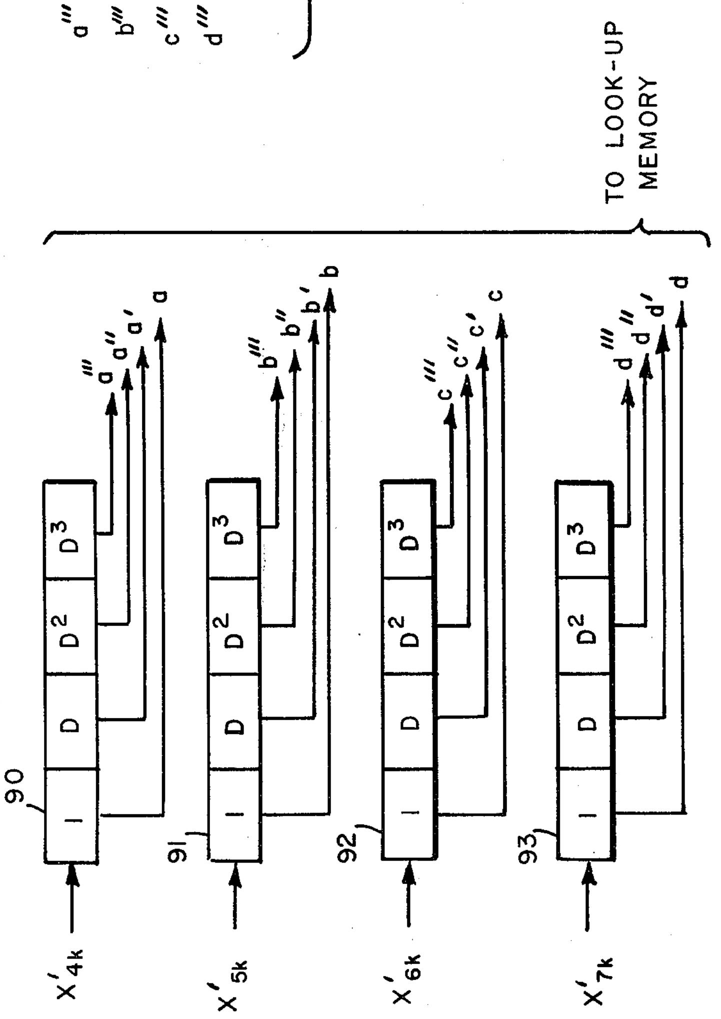
FIG. 13 shows a block diagram of a specific embodiment of another portion of the system of FIG. 11.

The syndrome represented at the output of the syndrome calculator is then stored in an appropriate syndrome storage subsystem which, as shown in FIG. 13, comprises the four shift registers 90–93 which produce an error pattern comprising sixteen data bits represented by groups of 4-bit data combinations delayed by successive time delay intervals D. Thus, the first incoming 4-bit data combination $x'_{01}$, $x'_{11}$, $x'_{21}$, $x'_{31}$ is delayed by three delay units, the next 4-bit combination $x'_{02}$, $x'_{12}$, $x'_{22}$, $x'_{32}$ is delayed by two delay units. The third 4-bit combination $x'_{03}$, $x'_{13}$, $x'_{23}$, $x'_{33}$ is delayed by one delay unit, and the fourth 4-bit combination is undelayed. Accordingly, at the end of three time delay units the syndrome has produced an error pattern comprising 16 bits represented by the output arrows labelled $a$, $a'$, $a''$, $a'''$; $b$, $b'$, $b''$, $b'''$; etc. diagrammatically represented as pattern A in FIG. 14. If such error pattern comprises all zeros, s shown by pattern B in FIG. 14, no error has occurred and no correction of the received data need be made. However, should the syndrome error pattern be other than zero in one or more bit positions, such as shown by pattern C in FIG. 14, the particular error pattern so generated represents a unique input error for a single-error situation, i.e., a situation in which an error occurred in only a single bit in the first 8-bit data combination of the input to syndrome calculator 77 and no further errors have occurred in the three subsequent 8-bit data combinations which follow. The syndrome error pattern is thereby uniquely determined by which of the first eight bits entering the decoder syndrome calculator is in error and an appropriate correction signal can be applied.

Such a system in which an appropriate syndrome is calculated and a corresponding error pattern thereby obtained so that an appropriate correction can be made to an input coded signal is described in U.S. Pat. No. 3,500,320 issued on Mar. 10, 1970 to J. L. Massey and entitled "Error Correcting Means for Digital Transmission Systems". Once the syndrome has been obtained it may be operated upon, in one embodiment, by a suitable algorithm to generate the error pattern associated with the syndrome. The error pattern is then used to correct the received sequence. In addition, the syndrome itself is modified to account for the correction in the received sequence as discussed in U.S. Pat. No. 3,402,393 issued to J. L. Massey on Aug. 2, 1963 and entitled "Error Detection and Correction In Signal Transmission By Use of Convolutional Codes". Alternatively, a look-up memory storage system may be used wherein all of the expected error patterns are stored and the incoming syndrome acts as an address to retrieve its corresponding error pattern. Upon determination of the appropriate error pattern corresponding to the input syndrome, an appropriate correction signal is generated at the output of the look-up memory system to provide the desired correction signal. Such a system is often referred to as an error pattern look-up memory system and will be understood by persons skilled in the coding art. In addition to the error pattern the corresponding syndrome correction pattern may also be stored in the look-up memory so as to provide the signal to be used in modifying the syndrome to account for the correction in the received sequence.

Although an example of a single error has been discussed above, the system can be used to correct for two-error and substantially all three-error situations. Even in the very few cases (less than 0.5%) where the three-error situation cannot be corrected, the uncorrectable errors occur only in the least significant data stream due to the use of the cross-stream tapered structure of the code.

Figure 15:
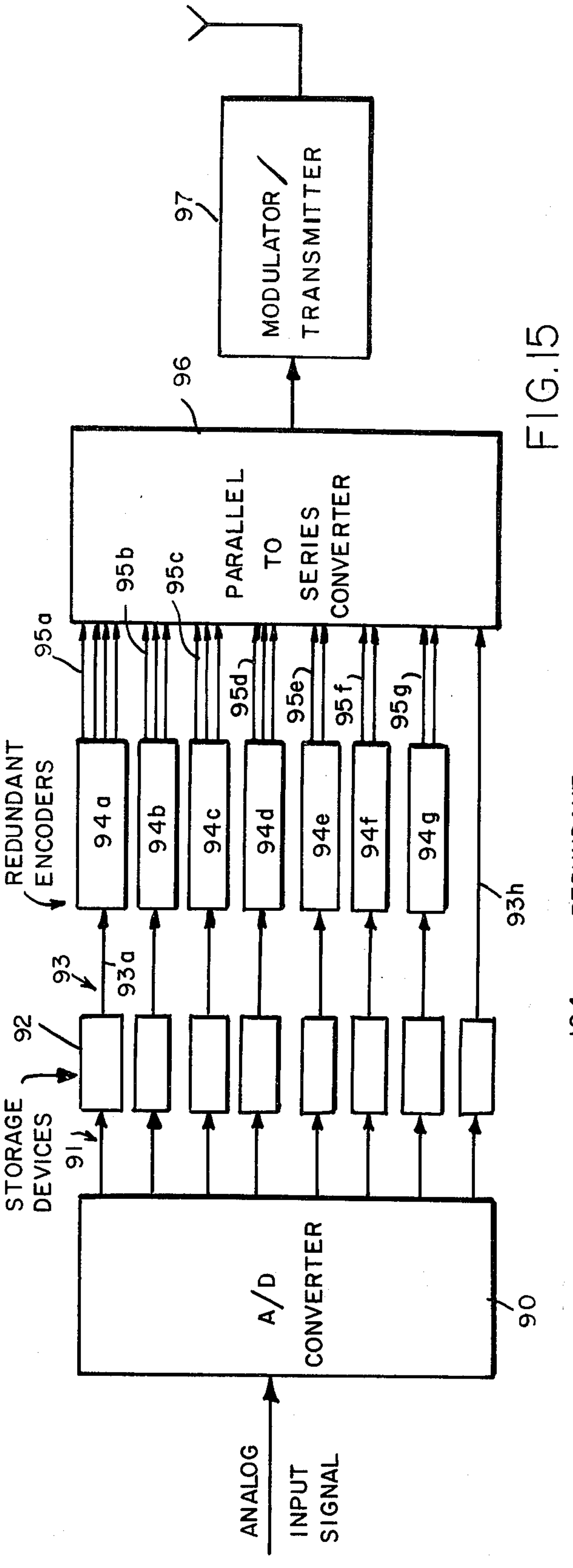
FIG. 15 shows a block diagram of an alternative embodiment of a transmitting system using separate redundant encoding elements with reference to FIG. 6.

An alternative embodiment of a redundant encoding system is shown with reference to FIG. 15 wherein a plurality of separate encoding elements are utilized rather than the tapered matrix convolutional encoding system of FIGS. 8–14. In the transmitter of such a system, for example, the bits may be quantized in 256 ($2^8$) input levels each represented by a specific 8-bit data combination at the output of an A/D converter 90. The output data streams therefrom (shown by arrows 91) are fed to a plurality of storage devices 92 for storing each combination as it is fed from the A to D converter 90. The storage of several analog samples is thereby achieved over some selected time period ($n\ \Delta$ T) so that bits of the same significance in each 8-bit data combination are essentially grouped together in each storage device in the storage process.

The data stream outputs (shown by arrows 93) from storage devices 92 then represent a plurality of data bit streams, the first arrowed line 93*a*, for example, representing a data bit stream including the most sifnificant information bits from each 8-bit data combination which has been stored and the remaining arrows representing data bit streams of progressively lesser significance. The data bit streams are thereupon fed to a plurality of separate redundant encoders 94 as shown. For simplicity, any one or more of the data bit streams representing, for example, the less significant information need not be fed to a redundant encoder at all but may be fed directly to the next part of the processing system as shown with reference to data stream 93*h* in FIG. 15.

Redundant encoders 94*a* through 94*g* are each arranged to introduce particular prescribed amounts of redundancy which redundancy amounts may differ for each encoder and, hence, for each data stream. Thus, data stream 93*a*, representing the most significant information, is arranged to be fed to a redundant encoder 94*a* which provides the greatest amount of redundance during the encoding process (shown diagrammatically by the four arrows 95*a* at the output thereof) and, therefore, the greatest protection from (i.e., the last susceptibility to) error for the bits in data stream 93*a*. The redundant encoders 94*b* through 94*d* provide lesser redundancy (shown by the three arrows 95*b*, 95*c* and 95*d* at the outputs thereof) and, therefore, lesser protection to the data streams which are fed thereto than that fed to encoder 94*a*. Encoders 94*e* through 94*g* provide less redundance, while the least significant data bit stream 93*h* is fed directly through with no redundancy encoding at all, as shown.

Other redundancy arrangements may be used. For example, the first four data streams may be fed to redundant encoders which provide progressively decreasing amounts of redundancy while the remaining four less important data streams may be fed through the system without any redundancy. Thus, many different arrangements for providing greater or less redundancy to each separate data stream may be devised depending on the particular application desired.

The redundant information from the outputs of encoders 94 is fed to a parallel to series converter 96 which provides a series representation of the data bits from the encoder process which bits are fed to a suitable modulator/transmitter subsystem 97, which may utilize a phase, a frequency or an amplitude modulation scheme as desired. Such a system, therefore, provides an arrangement of data information wherein the more significant information is fed to those encoders providing greater redundancy so that greater error protection can be achieved with reference to the overall data streams being fed thereto. Accordingly, the chances for error are considerably reduced from those achieved with a conventional system wherein each data bit stream is provided either with no redundancy or with an equal amount of redundancy so that errors in the more significant information are as likely to occur as those in the less significant information.

Figure 16:
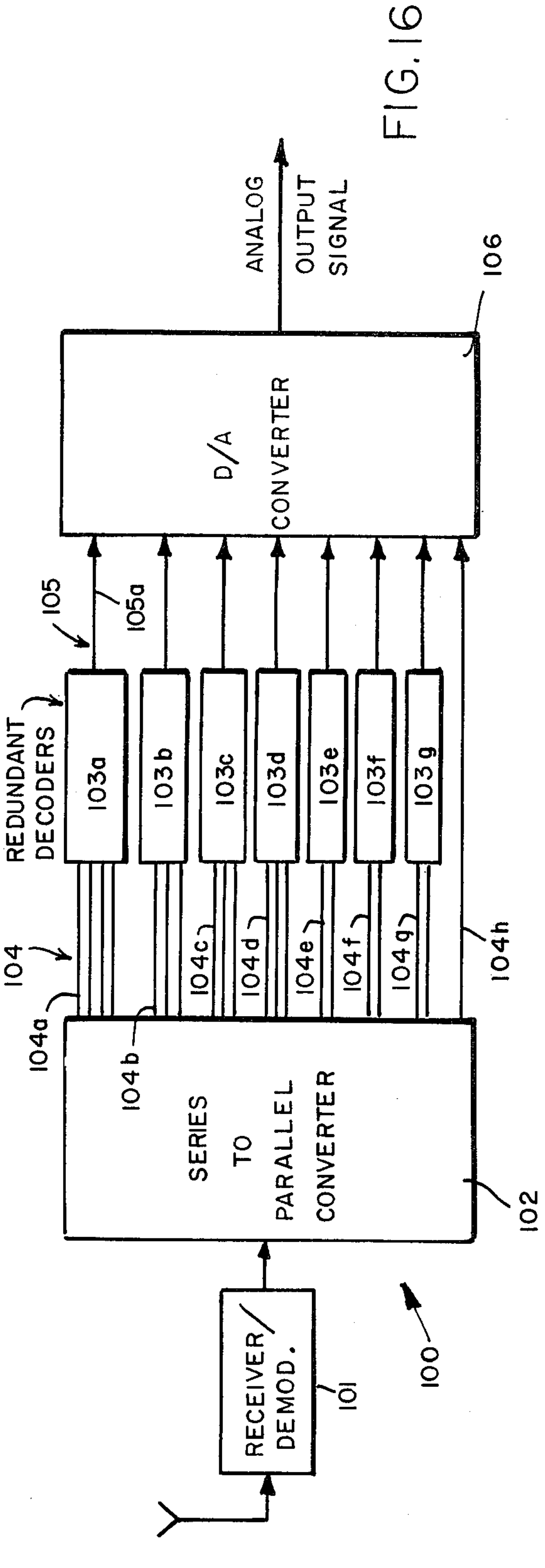
FIG. 16 shows a block diagram of an embodiment of a receiver system used with reference to the transmitting system of FIG. 15.

FIG. 16 shows a block diagram which depicts in general form a receiver decoding system for use with the encoding transmitter system of FIG. 15. As shown in FIG. 16 the transmitted signal is received decoding system 100 through an appropriate receiver/demodulator unit 101 which provides a demodulated data stream at its output, such data stream effectively representing the data stream from converter 96 of the transmitter system which was modulated for transmission at modulator/transmitter unit 97. Such demodulated data stream is then fed to an appropriate series to parallel converter unit 102 to provide parallel data bit streams 104. The latter data streams can be conveniently grouped in the form of data bit stream group 104*a* through 104*h*, as shown, such groups effectively corresponding to the data bit stream groups 95*a* through 95*g* in the tranmsmitter. Data bit stream groups 104*a* through 104*g* are then appropriately decoded by redundant decoders 103*a* through 103*g* (data stream 104*h* corresponds to data stream 93*h* which was not encoded at the transmitter and, accordingly, requires no decoding). The output of such decoders thereby provides data bit streams 105 which effectively correspond to the data bit streams 93 at the transmitter. In this manner, eight parallel data bit streams 105 are then available at the outputs of the decoder for conversion to analog form. Data bit stream 105*a* contains the most significant data information and, since it was encoded with the greatest amount of redundancy at the transmitter, its protection from error is greater than that of any other bit stram and, therefore, it is the bit stream least likely to contain an error. Data bit stream 104*h*, on the other hand, contains the least significant data information and, since it received no redundancy encoding at all, it is the most likely bit stream to contain an error. The intermediate bit streams have progressively varying degrees of protection from error depending on the amount of redundancy encoded therein at the transmitter.

The parallel data bit streams 105 are then fed to a suitable digital to analog converter 106 so as to produce an output analog signal which is a reproduction of the analog signal at the input of the transmitter.

A specific embodiment related to the transmitter-receiver system shown in FIGS. 15 and 16 is discussed with reference to FIGS. 17 and 18 wherein a practical and relatively simplified version thereof is depicted.

Figure 17:
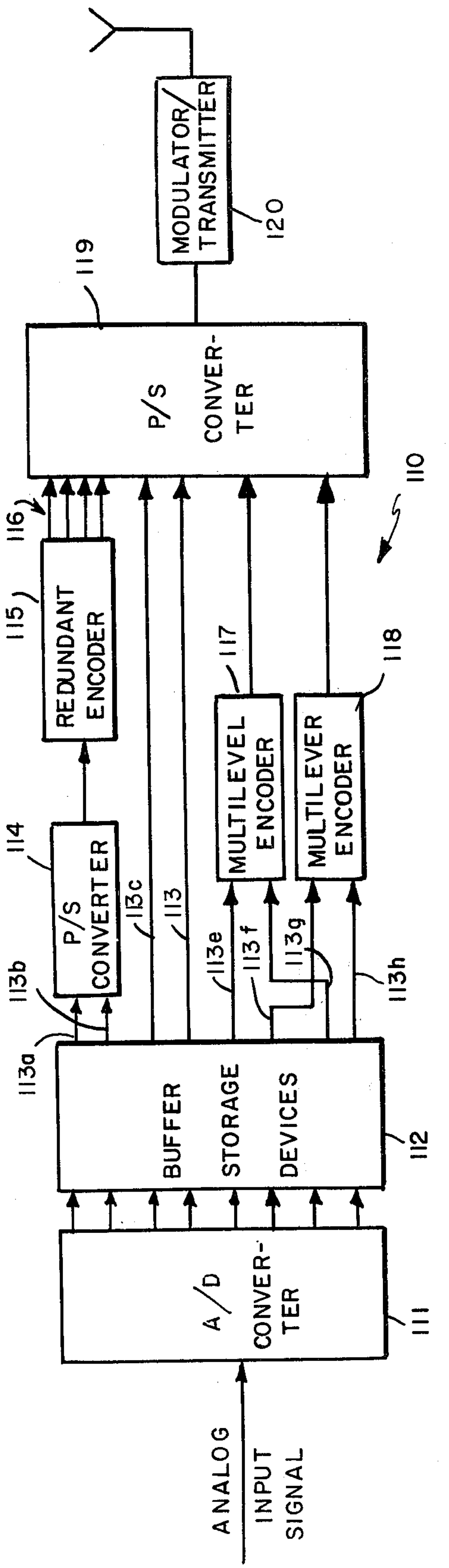
FIG. 17 shows a block diagram of an alternative embodiment of a redundant encoding transmitting system of the invention.

In FIG. 17 the transmitter system 110 is shown as comprising an analog to digital converter 111 which receives the analog input signal and converts it from analog to digital form as discussed above. The output of A/D converter 111 is, accordingly, a plurality of data bit streams which are appropriately stored in buffer storage devices 112 so that bits of the same significance in each parallel combination of data bits (here an 8-bit data combination resulting in eight data streams is shown) are grouped together in separate storage devices in the storage process, in much the same manner as discussed above with reference to FIG. 15. In the example under discussion the first two data bit streams 113*a* and 113*b* contain the most significant data information. The next bit streams 113*c* and 113*d* contain data of less significance, while the bit streams 113*e* through 113*h* contain information of progressively lesser significance. Accordingly, it is desired to provide the data information in stream 113*a* and 113*b* with the greatest amount of error protection while the information in the subsequent bit streams requires less protection from error.

In the system of FIG. 17, the first two data streams, 113*a* and 113*b*, are fed to an appropriate parallel to series converter unit 114 to produce a series combination of the input data bits thereto, which series combination is then fed to a redundant encoder unit 115 which is exemplified as producing a four-to-one redundancy, as represented by the four output bit streams 116. Redundant encoder 115 may be of a type well known to those in the art as, for example, a "Golay" redundant encoder which is adequately described in the book by W. W. Peterson, "Error Correcting Codes", John Wiley and Son, 1960. The redundant encoder 115, thus, produces 4 data bit streams containing redundantly encoded information derived from input bit streams 113*a* and 113*b*.

In particular example shown, the system does not encode bit streams 113*c* and 113*d*. The least significant information as contained in data bit streams 113*e* through 113*f* can, if desired, remain non-encoded also. However, in order to conserve the overall bandwidth requirements of the transmitter system, it is desirable that such streams be combined in a manner such that the overall bandwidth requirements for transmitting the data information therein is reduced in order to compensate for the increased bandwidth requirements which arise because of the redundant encoding of data streams 113*a* and 113*b*. Thus, data bit streams 113*e* through 113*f* are combined through appropriate multilevel encoder units 117 and 118 so as to produce two output data streams which, instead of being of a binary character, are of a quaternary character wherein the output data bits thereof assume one of four signal levels (as opposed to one of two levels as with binary data). The bandwidth requirements for transmission of two output streams of quaternary data derived from the four input binary data bit streams is less than that required for transmitting the original four binary data bit streams. The more significant data streams 113*e* and 113*f* are respectively fed to the most protected data bit positions in each of the multilevel encoders 117 and 118 while the less significant data streams 113*g* and 113*h* are respectively fed to the least protected data bit positions of such encoders, as shown. Even greater improvement can be achieved by using a greater number of encoding levels than the four (quaternary) levels of the specific example discussed here.

Thus, the number of data bit streams 116 that form the inputs to parallel to series converter 119 correspond to the same number of data bit streams 113 that form the input to the encoding system, so that overall bandwidth requirements are not increased by the encoding process.

In summary, the first four data stream inputs to parallel to series converter 119 represent the redundantly encoded data derived from the first two data streams 113*a* and 113*b* containing the most significant information. The next two data streams represent the non-encoded information in input data bit streams 113*c* and 113*d*. Finally, the last two data bit streams represent the combined information from input data bit streams 113*e* through 113*h*. Data bit streams 116 are then converted to a series form in parallel to series converter 119 and fed to a suitable modulator/transmitter unit 120 for transmission over a suitable transmission link.

Figure 18:
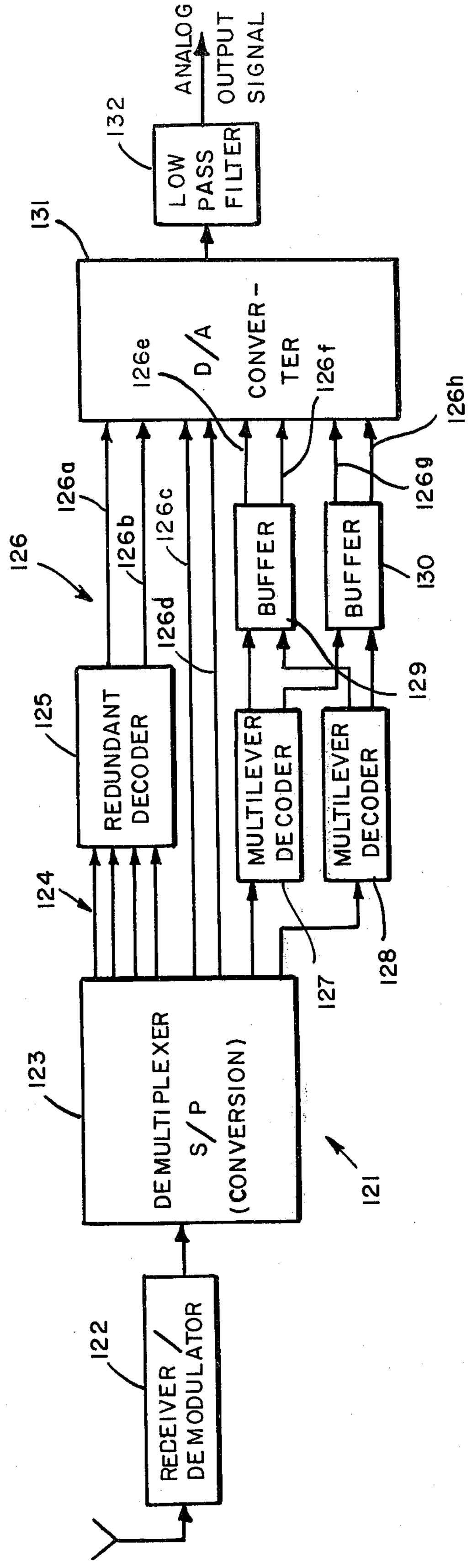
FIG. 18 shows a block diagram of an embodiment of a receiver system used with reference to the transmitting system of FIG. 17.

The receiver decoding system 121 used in combination with the transmittr encoding system of FIG. 17 is shown in FIG. 18. Thus, the modulated information is appropriately received, synchronized and demodulated by receiver/demodulator unit 122 to form a series stream of data bit information which can be fed to a demultiplexer unit 123 in the form of eight data bit streams 116 of transmitter 110. The first four data bit streams are then appropriately decoded by redundant decoder unit 125 corresponding ot the encoder unit of the transmitter which, as discussed above, may be a suitably known Golay decoder, as also described in the above-referenced book of W. W. Peterson. Such a decoding process produces two data bit streams 126*a* and 126*b* which effectively correspond to data bit streams 113*a* and 113*b* of transmitter 110. The data bit streams 126*c* and 126*d* from demultiplexer 123 represent the non-encoded transmitter information and effectively correspond to data bit streams 113*c* and 113*d* at the transmitter. Such data streams require no decoding in the receiver and, accordingly, are directly available as data bit streams 126*c* and 126*d*. The quaternary or multilevel encoded signals contained in the last two bit streams from demultiplexer 123 must be appropriately decoded by multilevel decoders 127 and 128 so that each single stream of quaternary data can be converted to two data streams of binary form, the four data bit streams resulting thereform being available as streams 126*e* through 126*f* via appropriate buffer units 129 and 130.

Accordingly, data bit streams 126*a* through 126*h* of receiver 121 effectively correspond to data bit streams 113*a* through 113*h* of transmitter 110 and are then fed to a suitable digital to analog converter 131 and through a low-pass filter 132 to produce an analog output signal which corresponds to the analog input signal at the transmitter. Since the first two data bit streams 113*a* and 113*b* of the transmitter have been encoded with suitable redundancy, the information contained therein is more protected form errors arising during transmission than the information contained in the remaining data bit streams. While the bit streams 113*e* through 113*h* are susceptible to the greatest amount of error during transmission, since such streams contain the least significant information, errors in the overall information that has been transmitted are much less likely to occur than if the selective encoding process of the invention had not been used.

What is claimed is:

1. A transmitter signal processing system for processing an analog signal for transmission over a communication channel, said transmitter signal processing system comprising means responsive to said analog signal for producing quantized data information representing periodic samples of said analog signal, different portions of said quantized data information having different significances;

processing means responsive to said quantized data information for producing a selectively arranged encoded information signal, said processing means including means for selectively arranging said quantized data information in accordance with said different significances thereof;

means for encoding said selectively arranged quantized data information to produce said selectively arranged encoded information signal in a manner so as to provide the more significant quantized data information with more protection from eror than the less significant quantized data information;

means responsive to said selectively arranged encoded information signal for re-arranging said signal in accordance with different significances to provide a re-arranged encoded information signal capable of being selectively protected by a modulation process;

modulation means responsive to said re-arranged encoded information signal for producing a modulated signal in which said re-arranged encoded information is provided with said selective protection by said modulation process; and means responsive to said modulated signal for transmitting said signal over said communication channel.

2. A processing system in accordance with claim 1 wherein said encoding means is a redundant encoding means for encoding said selectively arranged quantized data information so that said encoded data information has differing degrees of redundancy, the redundantly encoded data information being encoded so that more significant data information thereof is provided with greater redundancy and less significant data information thereof is provided with lesser redundancy.

3. A signal processing system in accordance with claim 2 wherein said encoding and selective rearranging means comprise a cross-stream tapered matrix encoder arranged so that said selectively arranged quantized data information is encoded and further rearranged in said selected format in accordance with a pre-selected operating matrix.

4. A signal processing system in accordance with claim 3 wherein said encoding and selective rearranging means includes a plurality of shift registers each responsive to a selected portion of said input data information to provide output data information representing said selected portion of said input data information in undelayed form, in a form delayed by a time unit D, and in a form delayed by a time unit $D^2$, said shift registers being arranged to produce encoded and selectively re-arranged data information in accordance with the following pre-selected operating matrix:

$$G = \begin{matrix} 1 & 0 & 0 & 0 & 1+D & D+D^2 & 1+D^2 & 1+D \\ 0 & 1 & 0 & 0 & 0 & 1+D & D+D^2 & 1+D^2 \\ 0 & 0 & 1 & 0 & 0 & 0 & 1+D & D+D^2 \\ 0 & 0 & 0 & 1 & 0 & 0 & 0 & 1+D+D^2 \end{matrix}$$

5. A signal processing system in accordance with claim 2 wherein said encoding means includes a plurality of separate encoders for providing encoded information having redundant characteristics, the redundant characteristics of at least some of said encoders being different;

said encoders each being responsive to separate portions of said selectively arranged quantized data information for producing said selected groups of encoded data information therefrom, said separate portions thereof having the greater significance being provided with greater encoded redundancy and said separate portions thereof having lesser significance being provided with lesser encoded redundancy.

6. A receiver signal processing system for processing a received signal which has been transmitted over a communication channel from a transmitter signal processing system which received signal is a modulated information signal representing an analog signal which has been quantized, selectively arranged and encoded by said transmitter system and which selectively arranged encoded information signal being further rearranged in accordance with a selected format and modulated by said transmitter system, said receiver system comprising means for synchronizing the operation of said receiver system with the operation of said transmitter system;

means responsive to said received signal for demodulating said received signal to produce a demodulated re-arranged encoded information signal;

means responsive to said demodulated re-arranged encoded information signal for converting said information signal into a form corresponding to that of said selectively arranged encoded information signal in said transmitter signal processing system;

means for decoding said re-formed selectively arranged encoded information signal and for further re-forming said decoded signal in conformity with said quantized data information in said transmitter signal processing system; and means responsive to said decoded and further reformed information signal for producing an analog signal substantially representing the analog signal processed by said transmitter signal processing system.

7. A transmitter signal processing system for processing an analog signal for transmission over a communication channel, said transmitter signal processing system comprising means responsive to said analog signal for producing quantized data information in parallel form representative of periodic samples of said analog signal, different portions of said quantized data information having different significances;

means for converting said quantized data parallel information to series form; and means responsive to said quantized data information in series form for selectively re-arranging said series information in accordance with said different signficances;

phase modulating means for producing a phase modulated signal wherein prescribed phases of said modulated signal are selected to represent prescribed quantized data combinations and wherein different bit positions in said prescribed data combinations are afforded different protections from error;

means for selectively feeding said selectively arranged quantized data information to said phase modulating means so that the more significant portions of said selectively re-arranged data information are placed in those positions of said phase modulating means having the greater protection from error; and means for transmitting said phase modulated signal over said communication channel.

8. A transmitter signal processing system in accordance with claim 7 wherein each sample of said quantized data information in parallel form includes n data bits, said bits having differing significances;

and said quantized data information in series form includes n streams of data bits, each stream containing data bits from successive samples having the same significance.

9. A signal processing system in accordance with claim 8 wherein said selective re-arranging means provides groups of $n/2$-bit data streams wherein alternating ones of said data bits of said $n$-bit data stream are contained in one of said $n/2$-bit data groups and intervening ones of said data bits of said $n$-bit data streams are contained in the other of said $n/2$-bit data

10. A signal processing system in accordance with claim 9 wherein said phase modulating means includes a phase modulator arranged to provide 2 $n/2$ prescribed phases representative of selected $n/2$-bit combinations, said $n/2$-bit combination being selected so that said combinations in adjacent phase positions differ in only one bit position and said selected $n/2$-bit combinations being further arranged so that successive data bit positions therein are progressively more susceptible to error.

11. A signal processing system in accordance with claim 10 wherein $n$ equals 8.

12. A transmitter signal processing system in accordance with claim 7 wherein said means for producing said information in parallel form further includes storage means for storing one or more periodic samples of said analog signal to provide a combined signal containing quantized data information from two or more of said periodic samples in parallel form for feeding to said processing means.

13. A receiver signal processing system for processing a received signal which has been transmitted over a communication channel from a transmitter signal processing system which received signal is a phase modulated quantized data information signal representing an analog signal which has been quantized in accordance with a first arrangement, selectively rearranged, and modulated by said transmitter system in accordance with said selective re-arrangement, said receiver system comprising means for synchronizing the operation of said receiver system with the operation of said transmitter system;

detector means responsive to said received signal for phase detecting said received signal to produce a demodulated quantized data information signal;

means responsive to said demodulated quantized data information signal for selectively re-forming said demodulated quantized data information in conformity with said first arrangement of the quantized data information as provided for in said transmitter signal processing means; and means responsive to said re-formed quantized data information for producing an analog signal substantially representing the analog signal processed by said transmitter signal processing system.

14. A receiver signal processing system for processing a received signal which has been transmitted over a communication channel from a transmitter signal processing system which received signal is a modulated signal representing an analog signal which has been quantized, redundantly encoded into selected groups of redundantly encoded data information in accordance with different degrees of redundancy, selectively re-arranged, and modulated by said transmitter system, said receiver signal processing system comprising receiving and demodulating means for demodulating said received signal to produce a demodulated information signal;

means for reforming said demodulated information signal to produce a redundantly encoded information signal;

means for decoding said redundantly encoded information signal in accordance with said different degrees of redundancy to produce decoded quantized data information;

means responsive to said quantized data information for producing an analog signal substantially representing the analog signal processed by said transmitter signal processing system.

15. A receiver signal processing system for processing a received signal which has been transmitted from a transmitter signal processing system, which received signal is a modulated signal representing an analog signal processed by said transmitter system in accordance with an encoded form, said receiver signal processing system comprising means for receiving and demodulating said received signal;

means responsive to said received signal for quantizing said received signal to produce encoded quantized data information;

means responsive to said encoded quantized data information for forming said data information into said encoded form;

means for decoding said encoded form of said data information to produce decoded quantized data information, said decoding means including a matrix syndrome decoder for producing decoded quantized data information susceptible of errors;

means for correcting errors in said decoded data information to produce corrected data information; and means responsive to said corrected data information for producing an analog signal substantially representing the analog signal processed by said transmitter signal processing system.

16. A receiver signal processing system in accordance with claim 15 wherein said matrix syndrome decoder includes a syndrome calculator for operating on said encoded form of said received data information to produce quantized data information, a first portion of which represents uncorrected data information in said encoded form and a second portion of which represents syndromes of said uncorrected data information;

means for storing said syndromes to produce quantized data information signals having error patterns determined by the errors in said received data information;

means for producing error correction signals in response to said error pattern signals;

means responsive to said uncorrected data information and to said error correction signal for producing said corrected data information.

17. A receiver signal processing system in accordance with claim 16 wherein said syndrome calculator includes a plurality of shift registers each responsive to a selected portion of said encoded form of said received data information to provide output data information representing said selected portion of said received data information in undelayed form, in a form delayed by a time unit D, in a form delayed by a time unit $D^2$, and in a form delayed by a time unit $D^3$, said shift registers being arranged to produce said uncorrected data information and said syndromes in accordance with the following pre-selected inverse operating matrix:

$$G^{-1} = \begin{array}{cccccccc} & 0 & 0 & 0 & 1+D & 0 & 0 & 0 \\ 0 & D & 0 & 0 & 0 & 1+D & 0 & 0 \\ 0 & 0 & D & 0 & 0 & 0 & 1+D & 0 \\ 0 & 0 & 0 & D+D^2 & 0 & 0 & 0 & 1+D+D^2 \\ 1 & D & 1+D+D^2 & 1+D^3 & 1 & D & 1+D+D^2 & 1+D^3 \\ 0 & 1 & D & 1+D+D^2 & 0 & 1 & D & 1+D+D^2 \\ 0 & 0 & 1 & D & 0 & 0 & 1 & D \\ 0 & 0 & 0 & 1 & 0 & 0 & 0 & 1 \end{array}$$

18. A receiver signal processing system in accordance with claim 16 wherein said syndrome storing means includes a plurality of shift registers each responsive to a selected portion of said syndromes to provide stored output data information representing said selection portions in undelayed form, in a form delayed by a time unit D, in a form delayed by a time unit $D^2$, and in a form delayed by a time unit $D^3$, said shift registers being arranged to produce stored date in a pattern determined by the presence of an error in said received signal.

19. A receiver signal processing system for processing a received signal which has been transmitted over a communication channel from a transmitter signal processing system which received signal is a modulated information signal representing an analog signal which has been quantized, selectively arranged and encoded by a plurality of separate redundant encoders of said transmitter system in accordance with different redundancy characteristics to produce selected groups of redundantly encoded data information and which selected groups have been further re-arranged in accordance with a selected format to produce a redundantly encoded and re-arranged signal, said receiver signal processing system comprising receiving and demodulating means for demodulating said received signal to produce a demodulated redundantly encoded and selectively re-arranged information signal in series form;

means for re-forming said series information signal into parallel form in accordance with said selected format to produce said selected groups of redundantly encoded parallel data information;

a plurality of separate decoders for providing decoded information, the decoding characteristics of at least some of said decoders being adapted to decode information having said different redundancy characteristics;

said decoders being arranged to be responsive to said selected groups having different redundancy characteristics for separately decoding said selected groups thereof to produce decoded selectively arranged quantized data information in parallel form; and means for converting said decoded selectively arranged quantized data information to analog form to provide an analog signal substantially representing the analog signal processed by said transmitter signal processing system.

20. A transmitter signal processing system for processing an analog signal for transmission over a communications channel, said transmitter signal processing system comprising means responsive to said analog signal for producing quantized data information in binary form representing periodic samples of said analog signal, said quantized data producing means being arranged to provide a plurality of parallel data bit streams, the information in different data bit streams having different significances;

means for converting a first selected number of said parallel data bit streams containing more significant information from parallel to series form;

first means for redundantly encoding said selected number of series data bit streams to provide a first number of parallel encoded bit streams greater than said first selected number thereof;

second means for encoding a second selected number of said parallel data bit streams containing less significant information to provide a second number of parallel encoded data bit streams less than said second selected number thereof, said encoding means converting said data streams from binary to multilevel form;

means for selectively feeding said second selected number of parallel data bit streams to said second encoding means so that the data bit streams thereof having the more significant information are placed in positions having the greater protection from error;

means responsive to said first number of parallel encoded data bit streams, said second number of parallel encoded data bit streams, and a third number of non-encoded parallel data bit streams for converting all of said data bit streams from parallel to series form;

means for modulating said series data bit streams and for transmitting said modulated signal over a communication channel.

21. A transmitter signal processing system in accordance with claim 20 wherein said second encoding means converts said second selected number of data bit streams from binary to quaternary form and wherein the total number of said first number of parallel encoded data bit streams, said second number of parallel encoded data bit streams, and said third number of parallel non-encoded data bit streams is equal to the number of parallel data bit streams provided by said quantized data information producing means.

22. A receiver signal processing system for processing a received signal which has been transmitted over a communication channel from the transmitter signal processing system of claim 20, said receiver system comprising means for demodulating said received signal to provide quantized data information in series form;

means for converting said received quantized data information from series form to a plurality of data bit streams in parallel form;

first decoding means for decoding a first selected number of said parallel data bit streams corresponding to said redundantly encoded data bit streams of said transmitted signal to produce a first number of decoded parallel data bit streams;

second decoding means for decoding a second selected number of said parallel data bit streams corresponding to said multilevel encoded data bit streams of said transmitted signal to produce a second number of decoded parallel data bit streams;

means responsive to said first number of parallel decoded data bit streams, said second number of parallel decoded data bit streams, and a third number of parallel non-decoded data bit streams corresponding to said parallel non-encoded data bit streams of said transmitted signal to produce an analog signal corresponding to the analog signal processed by said transmitter signal processing system.

23. A receiver signal processing system in accordance with claim 22 wherein said analog signal producing means includes a low pass filter means.

* * * * *

UNITED STATES PATENT AND TRADEMARK OFFICE

CERTIFICATE OF CORRECTION

PATENT NO. : 3,909,721

DATED : September 30, 1975

INVENTOR(S) : Julian J. Bussgang and Herbert Gish

It is certified that error appears in the above-identified patent and that said Letters Patent are hereby corrected as shown below:

Column 5, line 40, change "position No. 1" to --position No. 2--;
line 56, change "formating" to --formatting--;
line 64, change "form" to --from--.

Column 8, line 40, change "are" to --is--.

Column 13, line 23, change "s" to --as--.

Column 14, line 30, change "sifnificant" to --significant--.

Column 17, line 22, change "transmittr" to --transmitter--;
line 30, change "ot" to --to--;
line 50, change "126f" to --126h--;
line 61, change "form" to --from--.

Column 18, line 24, change "eror" to --error--.

Column 20, line 35, after "data" insert --groups--.

Column 22, line 35, in column 1, row 1 of the matrix, insert --D--.

FIG. 17, block 117, change "MULTILEVER" to --MULTILEVEL--.

FIG. 18, blocks 127 and 128, change "MULTILEVER" to --MULTILEVEL--.

Signed and Sealed this

Eighth Day of February 1977

[SEAL]

Attest:

RUTH C. MASON
*Attesting Officer*

C. MARSHALL DANN
*Commissioner of Patents and Trademarks*